United States Patent [19]

Thoma et al.

[11] 4,116,741

[45] Sep. 26, 1978

[54] TEXTILE COATING WITH POLYURETHANES

[75] Inventors: Wilhelm Thoma, Bergisch-Neukirchen; Jochen Wulff, Dusseldorf-Holthausen; Georg Niederdellmann, Dormagen, all of Germany

[73] Assignee: Bayer Aktiengesellschaft, Leverkusen, Germany

[21] Appl. No.: 542,734

[22] Filed: Jan. 20, 1975

[30] Foreign Application Priority Data

Jan. 22, 1974 [DE] Fed. Rep. of Germany ....... 2402799

[51] Int. Cl.$^2$ .......................... D06Q 1/00; B32B 5/02; B32B 27/40
[52] U.S. Cl. ..................................... 156/239; 156/243; 156/246; 260/32.6 NR; 427/148; 427/152; 428/91; 428/248; 428/424; 428/425; 528/85
[58] Field of Search ............... 156/230, 238, 239, 240, 156/243, 246, 247; 427/148, 152, 407 R, 411; 428/914, 91, 96, 97, 248, 424, 425; 260/77.5 NC, 77.5 AP, 32.6 NR

[56] References Cited

U.S. PATENT DOCUMENTS

| | | | |
|---|---|---|---|
| 3,100,721 | 8/1963 | Holden | 427/246 |
| 3,248,373 | 4/1966 | Barringer | 260/77.5 AQ |
| 3,496,042 | 2/1970 | Wyness | 156/155 X |
| 3,650,880 | 3/1972 | Tieniber | 156/239 X |
| 3,666,725 | 5/1972 | Irwin | 260/77.5 NC |

FOREIGN PATENT DOCUMENTS 1,052,042 12/1966 United Kingdom ............ 260/77.5 NC

*Primary Examiner*—Douglas J. Drummond
*Assistant Examiner*—Thomas Bokan
*Attorney, Agent, or Firm*—Gene Harsh; Lawrence S. Pope; Frederick H. Colen

[57] ABSTRACT

This application relates to textile sheets which have been coated with polyurethanes and to a process for coating said textile sheets wherein a solution of polyurethane is applied as a top coat to a release substrate and then a bonding coat is applied before application of the textile material. The polyurethane which is used as a top coat is prepared by reacting a dihydroxyl compound with a molecular weight between about 600 and 4000 and a mixture of at least 2 diols with a molecular weight between 62 and 450 with at least one organic diisocyanate. The invention overcomes the difficulty of the top coat being lifted from the release substrate in numerous areas while other areas remain firmly attached giving the so-called "hoar-frost" effect.

1 Claim, No Drawings

TEXTILE COATING WITH POLYURETHANES

This application relates to the use of special one-component polyurethanes for coating textile sheets by the reversal process. Segmented, substantially linear polyurethanes obtained from dihydroxy polyesters and/or dihydroxy polyethers, aromatic diisocyanates and a mixture of at least two glycols as chain-lengthening agents are used as top coats applied from solution. It has surprisingly been found that these top coats can be bonded to textile substrates with the aid of bonding coats applied as solutions which contain little or no dimethylformamide without the troublesome, so-called hoar-frost effect occurring.

It has long been known in the art to coat textiles such as woven or knitted fabrics and bonded mats with solutions of polyurethanes by the direct or reversal process. The articles obtained are used for the manufacture of outerwear garments, upholstery materials, bags and the like, shoe uppers, ground sheets, marquees and many other products.

In contrast to the two-component polyurethanes, which have been known for a considerable time, the so-called one-component polyurethanes are a more recent innovation. These products are obtained by reacting polyhydroxy compounds, in practice mainly dihydroxy polyesters or dihydroxy polyethers used as mixtures with glycols, preferably ethylene glycol or butane-1,4-diol, with aromatic diisocyanates, preferably 4,4'-diphenylmethane diisocyanate. Solutions of the one-component polyurethanes have a practically unlimited pot life. Film formation is a purely physical process which, in contrast to film formation of two-component polyurethanes, is not accompanied by any chemical reaction.

In addition to the use of glycols such as butanediol as chain-lengthening agents for the production of one-component polyurethanes, the use of diol urethanes, diol amides and diol ureas for building up the hard segments in polyurethanes is also known in the prior art (German Offenlegungsschrift No. 1,544,864).

It is also known to use diol mixtures as chain-lengthening agents for producing exceptionally heat-resistant polyurethane adhesives which are used for metal, rubber, wood and the like (Belgian Pat. No. 792,482).

For producing top coats and bonding coats for the reversal process, one-component polyurethanes are in practice used as 20 to 30% by weight solutions. The substantially linear one-component polyurethanes which can be prepared in the melt or in solution are difficult to dissolve owing to their high molecular weight and their constitution. The solutions must therefore always contain dimethylformamide or some other highly polar solvent such as dimethylacetamide or N-methyl pyrrolidone in proportions of from 20 to 60% by weight, based on the total quantity of solvent.

Coating a textile by the reversal process is generally carried out as follows: the top coat solution is applied to a release paper in a coating machine, e.g. by means of a doctor roll. After the first passage of the paper through the drying channel, the bonding solution is applied in a similar manner in a second coating apparatus or after return of the paper, and the textile web is then backed on to the bonding layer and the solvent mixture in the bonding layer is evaporated in the drying channel. On leaving the drying channel, the release paper and the now coated textile web are rolled up separately from each other.

In this basic process of reverse coating on release paper, considerable difficulties may arise which may make it impossible to produce a technically faultless coated textile web. When the bonding solution, which may contain either a one-component or a two-component polyurethane, is applied to the dry top coat layer which is about 0.1 mm in thickness, the so-called hoar-frost effect frequently occurs. This term is used to describe the following phenomenon:

If the solvent mixture of the bonding coat is a poor solvent for the polyurethane of the top coat, then it does not bring about any solution of the polyurethane but causes it to swell. As the result of this swelling, the film of top coat is lifted from the web of release paper in numerous areas while other areas remain firmly attached to the paper. This process of swelling, which begins at several points simultaneously, spreads within seconds over the whole area like hoar frost in the process of freezing and makes the surface unsuitable for further use.

According to the known art, the hoar-frost effect can be overcome by specifically adjusting the dissolving power of the solvent mixture in the bonding layer (generally dimethylformamide, methylethylketone and/or toluene, ethyl acetate, etc.), to the solubility of the top coat polyurethane. In practice, this usually means increasing the dimethylformamide content in the bonding layer solution in order to increase its dissolving power. If the solvent mixture in the bonding coat contains enough powerful solvents, e.g. 30 to 60% by weight of dimethylformamide, then the top coat does not swell but is slightly dissolved so that the hoar-frost effect does not occur. Increasing the dimethylformamide content in the bonding coat in order to avoid the hoar-frost effect is, however, undesirable both on economic grounds, in view of the relatively high cost of dimethylformamide, and on ecological grounds owing to the physiological properties of dimethylformamide.

It is therefore an object of this invention to provide a coated textile and a process for the coating thereof without the necessity of using a high amount of dimethylformamide solvents. Another object of this invention is to provide a more economical method of reverse coating of textiles. Still another object of this invention is to avoid the use of substantial amounts of dimethylformamide in the coating of textiles in order to have improved ecological and physiological methods for the production of textile coatings.

The foregoing objects and others are accomplished in accordance with the invention generally speaking by providing a process for producing coated textile sheets which comprises:

(A) applying to a release substrate an organic solvent solution top coat of a substantially linear polyurethane which is substantially free of reactive end groups prepared by a process comprising reacting polymer,
 (i) an organic dihydroxyl compound of molecular weight 500 to 4000 and
 (ii) a mixture of at least two organic diols of molecular weight 62 to 450 with at least two of which diols are present in a quantity of more than 5 mol %, and
 (iii) an aromatic diisocyanate.

(B) evaporating sufficient solvent to leave a substantially dried top coat on said substrate (C) applying a bonding coat solution to said top coat (D) applying said textile sheet to be coated to said release substrate whereby said top coat and said bonding coat are therebetween (E) substantially evaporating the solvent from said bonding coat and (F) separating the resulting coated textile from said release substrate.

Thus, it has now surprisingly been found that if certain special one-component polyurethanes are used, the top coats can be bonded to the textile substrate with the aid of bonding coat solutions which contain little or no dimethylformamide (DMF contents less than 40% preferably less than 25% by weight in the solvent mixture) without the troublesome hoar-frost effect taking place.

This invention relates to a process for coating textile sheets with polyurethanes by the reversal process according to which in the first stage the solution of a polyurethane which is substantially free from reactive end groups is applied to a release substrate to form the top coat which is then dried and, in the second stage, a solution of bonding coat is applied to the top coat, the textile sheet is backed on to the bonding coat, the solvent in the bonding coat is evaporated off in a second drying operation and the coated textile is then lifted from the release substrate, which process is characterized in that the substance used as top coat is a polyurethane which has been prepared by reacting (a) at least one higher molecular weight dihydroxyl compound with a molecular weight of between 600 and 4000, (b) at least one organic diisocyanate and (c) a mixture of at least two different diols with a molecular weight of between 62 and 450, at least two of which diols are present in a quantity of more than 5 mols-%, based on the mixture of low-molecular weight diols, using a molar ratio of components (a) and (c) of between 1:1 and 1:5.

The polyurethanes may be prepared solvent-free or in solution in known manner, by either the one-shot or the prepolymer process.

The dihydroxy polyesters and/or dihydroxy polyethers used preferably have molecular weights of between 600 and 4000, more preferably between 800 and 2500.

The dihydroxy polyesters are prepared in known manner from one or more dicarboxylic acids which preferably contain at least 6 carbon atoms and one or more dihydric alcohols.

Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic and/or heterocyclic and may be substituted, e.g. by halogen atoms, and/or unsaturated. The following are given as examples: succinic acid; pimelic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid which may be mixed with monomeric fatty acids; dimethyl terephthalate or bisglycol terephthalate. Aliphatic dicarboxylic acids are preferred and particularly adipic acid. Suitable dihydric alcohols include e.g. ethylene glycol; propylene-1,2- and -1,3-glycol; butylene-1,4- and -2,3-glycol; hexane-1,6-diol; octane-1,8-diol; neopentyl glycol; 1,4-bis-hydroxymethyl cyclohexane; 2-methylpropane-1,3-diol; diethylene glycol; triethylene glycol; tetraethylene glycol; polyethylene glycols; dipropylene glycol; polypropylene glycols, dibutylene glycol and polybutylene glycols. Polyesters of lactones such as $\epsilon$-caprolactone or hydroxycarboxylic acids such as $\epsilon$-hydroxy-caproic acid may also be used.

Apart from such polyesters, hydroxy polycarbonates are also suitable for preparing the polyurethanes according to the invention, particularly those obtained from hexane-1,6-diol and diaryl carbonates, preferably diphenyl carbonate, as well as esterification products of straight chain hydroxyalkane monocarboxylic acids which contain at least 5 carbon atoms (preferably $\epsilon$-hydroxy caproic acid) or the corresponding lactone polymers.

The polyethers with two hydroxyl groups which may be used according to the invention are also known per se and are prepared, for example, by polymerizing epoxides such as ethylene oxide, propylene oxide, butylene oxide, tetrahydrofuran, styrene oxide or epichlorohydrin, either each with itself, e.g. in the presence of boron trifluoride, or by addition of these epoxides, either as mixtures or successively, to starting components which contain reactive hydrogen atoms such as alcohols or amines, e.g. water, ethylene glycol, propylene-1,2- or -1,3-glycol, 4,4'-dihydroxy-diphenylpropane, aniline, ethanolamine or ethylene diamine.

Dihydroxy butylene glycol polyethers and dihydroxy propylene glycol polyethers are particularly preferred.

The starting components used according to the invention also include aliphatic, cycloaliphatic, araliphatic, aromatic and heterocyclic polyisocyanates such as those described e.g. by W. Siefken in Justus Liebigs Annalen der Chemie, 562, pages 75 to 136, for example ethylene diisocyanate; tetramethylene-1,4-diisocyanate; hexamethylene-1,6-diisocyanate; dodecane-1,12-diisocyanate; cyclobutane-1,3-diisocyanate; cyclohexane-1,3- and -1,4-diisocyanate and any mixtures of these isomers; 1-methyl-2,6-diisocyanatocyclohexane; 1-methyl-2,4-diisocyanatocyclohexane; 1-isocyanato-3,3,5-trimethyl-5-isocyanatomethylcyclohexane, hexahydrotolylene-2,4- and -2,6-diisocyanate and any mixtures of these isomers; hexahydrophenylene-1,3- and/or -1,4-diisocyanate; perhydrodiphenyl methane-2,4'- and/or -4,4'-diisocyanate; phenylene-1,3- and -1,4-diisocyanate; tolylene-2,4- and -2,6-diisocyanate and any mixtures of these isomers; diphenylmethane-2,4'- and/or 4,4'-diisocyanate, naphthylene-1,5-diisocyanate or 4,4'-diphenyl-dimethylmethane diisocyanate or mixtures of these compounds. 4,4'-diphenylmethane-diisocyanate is particularly suitable.

The low-molecular weight diol components which are used as chain-lengthening agents for the preparation of the polyurethanes used according to the invention preferably have molecular weights of from 62 to 450. According to the invention, various types of diol compounds may be used, for example (a) alkane diols such as ethylene glycol, propylene-1,3-glycol and propylene-1,2-glycol, butane-1,4-diol, pentane-1,5-diol, dimethylpropane-1,3-diol and hexane-1,6-diol;

(b) ether diols such as diethylene glycol, triethylene glycol or 1,4-phenylene-bis-(β-hydroxyethyl ether);
(c) amino diols such as N-methyl-diethanolamine or N-methyldipropanolamine;
(d) ester diols of the general formulae

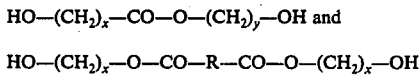

in which
R represents an alkylene or arylene group containing 1 to 10, preferably 2 to 6 carbon atoms,
x = 2 to 6, and
y = 3 to 5,
e.g. δ-hydroxybutyl-ε-hydroxycaproic acid esters; ω-hydroxyhexyl-δ-hydroxybutyric acid esters; bis-(β-hydroxyethyl)-adipate and bis-(β-hydroxyethyl)-terephthlate;
(e) diol urethanes of the general formula

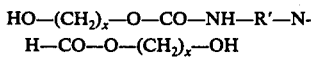

in which
R' represents an alkylene, cycloalkylene or arylene group containing 2 to 15, preferably 2 to 6 carbon atoms and
x represents an integer of between 2 and 6,
e.g. 1,6-hexamethylene-bis-(β-hydroxyethyl urethane) or 4,4'-diphenylmethane-bis-(δ-hydroxybutyl urethane);
(f) diol ureas of the general formula

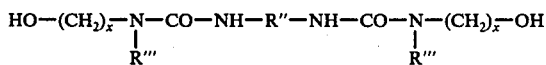

in which
R" represents an alkylene, cycloalkylene or arylene group containing 2 to 15, preferably 2 to 9 carbon atoms,
R''' represents a hydrogen atom or a methyl group and x = 2 or 3,
e.g. 4,4'-diphenylmethane-bis-(β-hydroxyethyl urea) or the compound

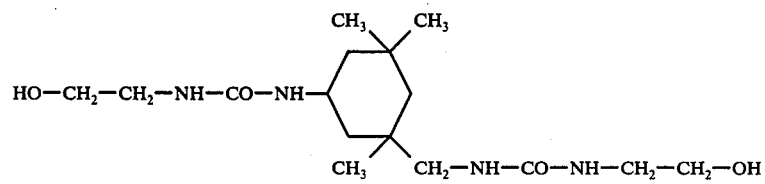

According to the invention, a mixture of at least two of the above mentioned diols is used as chain-lengthening agent, and the mixture should contain at least two of these diols in a quantity of more than 5 mols-%, based on the diol mixture.

The diol mixtures are preferably mixtures of butane-1,4-diol with hexane-1,6-diol; butane-1,4-diol with δ-hydroxybutyl-ε-hydroxy-caproic acid ester or butane-1,4-diol and/or hexane-1,6-diol with 4,4'-diphenylmethane-bis-(β-hydroxyethyl urea). Mixtures of two diols used in a molar ratio of between 9:1 and 1:9, particularly between 7:3 and 3:7, are preferred.

The molar ratio of higher molecular weight polyesters or polyethers to the mixture of low-molecular weight chain-lengthening agents should be between 1:1 and 1:5, preferably between 1:1.5 and 1:3.5. The polyurethanes used as top coats are substantially free from reactive end groups. They are generally prepared using an NCO/OH ratio of 0.95 to 1.05, preferably 0.98 to 1.0.

The solvents for the polyurethanes used according to the invention may be either highly polar or low polar solvents known per se, or mixtures of such solvents. The following are mentioned as examples: dimethylformamide; (subject to limitations elsewhere disclosed) dimethylacetamide; dimethyl sulphoxide, ethyl acetate; methyl glycol acetate; ethyl glycol acetate; methyl ethyl ketone; acetone; cyclohexanone; tetrahydrofuran, dioxane; halogenated hydrocarbons such as chlorobenzene or dichloroethylene and aromatic hydrocarbons such as toluene or xylene.

The bonding coats by means of which the top coats according to the invention are bonded to the textile substrate may, in principle, be built up in the same way as the top coats but, for the bonding coats, it is also possible to use polyurethanes which have been prepared with the aid of a single chain-lengthening agent. In addition to single-component polyurethanes, the two-component systems known per se may also be used as bonding coats according to the invention. These bonding coats are generally solutions of a mixture of polyurethane prepolymers which contain hydroxyl end groups and have a molecular weight of about 10,000 to 80,000, preferably 20,000 to 50,000, polyisocyanates and catalysts. Apart from the polyisocyanates already mentioned above, compounds which contain more than two isocyanate groups of reaction products of polyhydroxyl compounds with excess polyisocyanate may also be used, e.g. a 75% solution in ethyl acetate of a polyisocyanate obtained from trimethylolpropane and tolylene-2,4-diisocyanate in which the isocyanate content of free tolylene diisocyanate is less than 0.3%.

Catalysts known per se are also often used in the bonding coat solutions, e.g. tertiary amines such as triethylamine, tributylamine, N-methyl-morpholine, N-ethyl-morpholine, N,N,N',N'-tetramethyl-ethylene diamine, 1,4-diaza-bicyclo-(2,2,2)-octane, N-methyl-N'-dimethyl-aminoethyl-piperazine, N,N-dimethyl benzylamine, bis-(N,N-diethylaminoethyl)-adipate, N,N-diethyl benzylamine, pentamethyl diethylene triamine, N,N-dimethyl cyclohexylamine, N,N,N',N'-tetramethyl-1,3-butanediamine, N,N-dimethyl-β-phenyl ethylamine, 1,2-dimethyl imidazole or 2-methyl imidazole.

Suitable tertiary amines containing hydrogen atoms which are reactive with isocyanate groups include e.g. triethanolamine, triisopropanolamine, N-methyl-diethanolamine, N-ethyldiethanolamine, N,N-dimethylethanolamine and their reaction products with alkylene oxides such as propylene oxide and/or ethylene oxide.

Silaamines with carbon-silicon bonds as described e.g. in German Patent Specification No. 1,229,290 may also be used as catalysts e.g. 2,2,4-trimethyl-2-silamorpholine and 1,3-diethylaminoethyl-tetramethyl-disiloxane.

According to the invention, organic metal compounds may also be used as catalysts, particularly organic titanium compounds.

Other representatives of catalysts which may be used according to the invention and details concerning the action of the catalysts are described in Kunststoff-Handbuch, Volume VII, published by Vieweg and Hochtlen, Carl-Hanser-Verlag, Munich 1966, e.g. on pages 96 to 102.

The solvents used for the bonding coats may be any of the substances already mentioned for the top coats. Highly polar solvents such as dimethylformamide, however, should only be present in quantities of less than 40% by weight and preferably less than 25%, based on the total mixture of solvents.

Pigments, fillers, and other auxiliary agents such as stabilizers to prevent hydrolysis, UV stabilizers, antioxidants, polysiloxanes, cross-linking agents and accelerators may be added in the usual way to the top coat solutions containing the polyurethanes used according to the invention and to the bonding coat solutions.

The following Examples demonstrate the improved application of top coats on the special one-component polyurethanes used according to the invention with the aid of bonding coats which are free from or contain little dimethylformamide. Unless otherwise indicated, the figures given represent parts by weight or percentages by weight.

EXAMPLES OF METHOD

General method of coating

In a coating machine, the top coat solution is applied to a release paper by means of a doctor roll. The quantity applied is in each case 120 g of solution per m². After the first passage through the drying channel which has an air temperature of 100° C at the inlet and 140° C at the outlet, 120 g per m² of bonding coat solution are applied in a similar manner either in a second coating installation or after return of the web of paper. The textile web, a napped cotton duvetyn weighing 240 g per square meter, is applied and the solvent mixture in the bonding coat is evaporated off in the drying channel.

On leaving the drying channel, the release paper and the coated textile web are rolled up separately from each other.

EXAMPLE 1

Top coat solution D1 is a 25% solution of a polyester urethane in dimethylformamide (DMF)/methyl ethyl ketone (MEK) (1:1) with a viscosity of 10,000 cP/25° C. The polyester urethane elastomer is obtained from 2000 g (1.0 mol) of a copolyester of ethylene glycol/butane-1,4-diol and adipic acid (molecular weight 2000), 108.0 g (1.20 mol) of butane-1,4-diol, 141.6 g (1.20 mol) of hexane-1,6-diol and the equivalent quantity of 4,4'-diphenylmethane diisocyanate (850 g) by a one-shot process. The molar ratio of chain-lengthening agents is therefore 1:1.

Top coat solution D2 is a 25% solution of a polyester urethane in DMF/MEK (1:1) with a viscosity of 8000 cP/25° C. The polyester urethane was in this case prepared by the one-shot process from 2000 g (1.0 mol) of a copolyester as in the case of top coat solution D1, 86.4 g (0.96 mol) of butane-1,4-diol, 293.8 g (1.44 mol) of ε-hydroxybutyl-ε-hydroxy-caproic acid ester (reaction product of butane-1,4-diol and ε-caprolactone) and the equivalent quantity of 4,4'-diphenylmethane diisocyanate (850 g) (molar ratio of chain-lengthening agents: 40:60).

Top coat solution D3 (comparison experiment) is a 25% solution of a polyester urethane in DMF/MEK (1:1) with a viscosity of 8000 cP/25° C which has been obtained by the one-shot process from 2000 g (1.0 mol) of the same copolyester as used for top coat solution D1, 216.0 g (2.40 mol) of butane-1,4-diol, in other words only one diol as chain-lengthening agent, and the equivalent quantity of 4,4'-diphenylmethane diisocyanate (850 g).

The top coat solutions are colored by adding 6 to 8% of commercial pigment pastes.

Bonding coat solution H1 is a 30% solution of a polyester urethane in ethyl acetate with a viscosity of 25,000 cp/25° C. The polyester urethane is obtained from 500 g of a polyester of ethylene glycol and adipic acid (molecular weight about 2000), 500 g of a polyester of diethylene glycol and adipic acid (molecular weight about 2000) and 87.0 g of a mixture of tolylene-2,4- and -2,6-diisocyanate isomers (65/35%). Before the bonding coat solution is used, 5.0 g of a 75% solution in ethyl acetate of a polyisocyanate (10.5% isocyanate) which has been prepared from 1.0 mol of trimethylolpropane and 3.0 mol of tolylene-2,4-diisocyanate and, as catalyst, 5.0 g of a 10% solution in ethylene dichloride/ethyl acetate (1:1) of a reaction product of 10 mol of N-methyl-diethanolamine and 2.0 mol of phenyl isocyanate are added per 100 g of solution. The bonding coat solution can be adjusted to a suitable viscosity for spread coating by adding a further quantity of ethyl acetate.

Bonding coat solution H2 is a 25% solution of a polyester urethane in DMF/MEK (1:3) with a viscosity of 7000 cP/25° C which has been obtained by a one-shot process from 1700 g (1.0 mol) of a copolyester of hexane-1,6-diol, neopentyl glycol and adipic acid (molecular weight about 1700), 135.0 g of butane-1,4-diol (1.50 mol) and the equivalent quantity of 4,4'-diphenylmethane diisocyanate (625 g).

The three top coats and two bonding coats are combined with each other as indicated in the general method of procedure. The polyester urethanes in top coats D1 and D2, which according to the invention have been prepared using a diol mixture as chain-lengthening agent, can be bonded with the aid of bonding coat solutions H1 and H2 which contain little or no DMF without any trouble, i.e. without the occurrence of hoar frost. The comparable polyester urethane in top coat D3, which contains only one diol as chain-lengthening agent, i.e. butane-1,4-diol, gives rise to the much feared formation of hoar frost when bonded with the aid of bonding coats H1 and H2, thereby rendering the textile coatings completely unusable in all cases

EXAMPLE 2

Top coat solution D4 is a 25% solution of a polyester-/urethane in DMF/MEK (3:2) with viscosity of 10,000 cP/25° C which has been prepared from 1000 g (0.5 mol) of a hexane-1,6-diol polycarbonate (from hexane-1,6-diol and diphenyl carbonate) with a molecular weight of 2000, 1000g (0.5 mol) of a butane-1,4-diol-/adipic acid polyester with a molecular weight of 2000, 176.4 g of butane-1,4-diol (1.96 mol), 107.5 g (0.84 mol) of hexane-1,6-diol and the equivalent quantity of 4,4'-diphenylmethane diisocyanate (950 g). The molar ratio of chain-lengthening agents is 70:30.

Top coat solution D5 (comparison) is a 25% solution of a polyester urethane in DMF/MEK (3:2) having a viscosity of 9000 cP/25° C. The polyurethane in top coat D5 is synthesized from 1000 g (0.5 mol) of the hexane-1,6-diol polycarbonate of D4 and 1000 g (0.5 mol) of butane-1,4-diol/adipic acid polyester in the same way as top coat D4 but only 252.0 g (2.80 mol) of butane-1,4-diol were used as chain-lengthening agent. The reaction of the dihydroxyl compounds with 950 g of 4,4'-diphenylmethane diisocyanate is again carried out in a similar manner to that used for D4.

Both top coats were prepared by the one-shot process. Bonding coat solution H3 is a 30% solution of the two-component polyurethane described under H1 in DMF/MEK (1:3) using the same quantities of crosslinking agents and accelerators.

Top coats D4 and D5 were again combined with bonding coats H2 and H3 in accordance with the general method of procedure.

The polyurethane in top coat D4 prepared using the mixture of chain-lengthening agents can be bonded with the aid of bonding coat solutions H2 and H3 without the formation of hoar frost whereas, when top coat D5 is used, the hoar-frost effect occurs both with bonding coat H2 and with bonding coat H3.

EXAMPLE 3

Top coat solution D6 is a 25% solution of a polyester urethane in DMF/MEK (3:2) with a viscosity of 8000 cP/25° C. The polyester urethane was obtained from 900 g (1.0 mol) of a butane-1,4-diol/adipic acid polyester with a molecular weight of 900, 63.0 g (0.7 mol) of butane-1,4-diol, 82.6 g (0.7 mol) of hexane-1.6-diol and 600 g (2.4 mol) of 4,4'-diphenylmethane diisocyanate (molar ratio of chain-lengthening agents 1:1).

Top coat solution D7 (comparison experiment) is a 25% solution of a polyester urethane in DMF/MEK (3:2) with a viscosity of 10,000 cP/25° C which has been synthesized from 900 g (1.0 mol) of a butane-1,4-diol-/adipic acid polyester with a molecular weight of 900 and the equivalent quantity of 4,4'-diphenylmethane diisocyanate (600 g) using 126.0 g (1.40 mol) of butane-1,4-diol as chain-lengthening agent.

Top coats D6 and D7 were prepared from a prepolymer with isocyanate end groups which had been obtained from a polyester and diisocyanate and had then been reacted with the chain-lengthening agents.

Solutions H2 and H3 were used as bonding coats as in Example 2. Top coat D6 can again be applied with the aid of both bonding coat solutions without any technical difficulties whereas the hoar-frost effect is obtained in both cases when the comparison product D7 is used.

EXAMPLE 4

Top coat solution D8 is a 25% solution of a polyester urethane in DMF/MEK (1:1) with a viscosity of 9000 cP/25° C. The polyester urethane was prepared from (a) the reaction product of 1700 g (2.0 mol) of a hexane-1,6diol/adipic acid polyester (molecular weight 850) and 174.0 g (1.0 mol) of a mixture of tolylene-2,4- and -2,6-diisocyanate (65/35%). (b) 171.0 g (1.90 mol) of butane-1,4-diol, (c) 94.4 g (0.80 mol) of hexane-1,6-diol as chain-lengthening agent and (d) 925 g (3.70 mol) of 4,4'-diphenylmethane diisocyanate (molar ratio of chain-lengthening agents 70:30).

Top coat solution D9 is a 25% solution of a polyester urethane in DMF/MEK (1:1) with a viscosity of 10,500 cP at 25° C. Preparation of the polyester urethane was carried out in a similar manner to that employed for the polyurethane of top coat D8 but the chain-lengthening agent used was a mixture of 72.0 g (0.80 mol) of butane-1,4-diol and 224.2 g (1.90 mol) of hexane-1,6-diol (molar ratio of diols: 30:70).

Top coat solution D10 (comparison experiment) is a 25% solution of a polyester urethane in DMF/MEK (1:1) with a viscosity of 9000 cP/25° C. The polyester urethane is synthesized in a manner analogous to the polyurethanes of top coat solutions D8 and D9 but contains only one diol as chain-lengthening agent, namely 243.0 g (2.70 mol) of butane-1,4-diol.

Top coat solution D11 (comparison experiment) is a 25% solution of a polyester urethane in DMF/MEK (1:1) with a viscosity of 10,800 cP/25° C. The polyester urethane is synthesized in a similar manner to the polyester urethanes of top coat solutions D8 and D9 but contains only one diol as chain-lengthening agent, namely 318.6 g (2.70 mol) of hexane-1-6-diol.

Bonding coat solution H4 corresponds to bonding coat solution H1 but contains 12.5% DMF, based on the solvent mixture.

The four top coats D8 to D11 are bonded in accordance with the general method of procedure with the aid of H2 and H4. Top coats D8 and D9 can be applied problem-free but when D10 and D11 are bonded, the hoar-frost effect occurs both when using H2 and when using H4.

EXAMPLE 5

Top coat solution D12 is a 30% solution of a polyester urethane in DMF/MEK (3:2) with a viscosity of 35,000 cP/25° C which has been prepared from (a) the reaction product of 1800 g (2.0 mol) of a butane-1,4-diol/adipic acid polyester (molecular weight 900) and 174.0 g (1.0 mol) of a mixture of tolylene-2,4- and -2,6-diisocyanate (65/35%), (b) 135.0 g (1.50 mol) of butane-1,4-diol, (c) 177.0 g (1.50 mol) of hexane-1,6-diol and (d) 1000 g (4.0 mol) of 4,4'-diphenylmethane diisocyanate (molar ratio of chain-lengthening agents 1:1).

Top coat solution D13 is a 30% solution of a polyester urethane in DMF/MEK (3:2) with a viscosity of 34,000 cP/25° C. The polyester urethane is built up in a similar manner to the top coat D12 but the chain-lengthening agent used was a diol mixture of 54.0 g (0.60 mol) of butane-1,4-diol and 283.2 g (2.40 mol) of hexane-1,6-diol (molar ratio 20:80).

Top coat solution D14 is a 30% solution of a polyester urethane in DMF/MEK (1:1) with a viscosity of 40,000 cP/25° C which has been prepared from (a) the reaction product of 1800 g (2.0 mol) of a polybutane-1,4-diol/adipic acid polyester (molecular weight 900) and 174.0 g (1.0 mol) of a mixture of tolylene-2,4- and 2,6-diisocyanate (65/35%), (b) 63.0 g (0.70 mol) of butane-1,4-diol, (c) 330.4 g (2.8 mol) of hexane-1,6-diol and (d) 1125 g (4.50 mol) of 4,4'-diphenylmethane diisocyanate (molar ratio of chain-lengthening agents 20:80).

Top coat solution D15 (comparison experiment) is a 30% solution of a polyester urethane in DMF/MEK (3:2) with a viscosity of 37,000 cP/25° C. The polyurethane is synthesized similarly to the polyurethane of top coat solutions D12 and D13 but contains only one diol as chain-lengthening agent, namely 270.0 g (3.0 mol) of butane-1,4-diol.

Top coats D12 to D15 are again laminated with the aid of bonding coats H2 and H4. D12, D13 and D14 can be processed without any difficulty but the hoar-frost effect again occurs when D15 is applied with the aid of H2 or H4.

EXAMPLE 6

Top coat solution D16 is a 25% solution of a polyester urethane in DMF/MEK (3:2) with a viscosity of 9000 cP/25° C. The polyurethane was prepared from (a) the reaction product of 1800 g (2.0 mol) of a butane-1,4-diol/adipic acid polyester with a molecular weight of 900 and 174 g (1.0 mol) of a mixture of tolylene-2,4- and -2,6-diisocyanate (65/35%), (b) 302.1 g (2.56 mol) of hexane-1,6-diol, (c) 57.6 g (0.64 mol) of butane-1,4-diol and (d) 1050 g (4.20 mol) of 4,4'-diphenylmethane diisocyanate (molar ratio of chain-lengthening agents 80:20).

Top coat solution D17 is a 25% solution of a polyester urethane in DMF/MEK (3:2) with a viscosity of 10,000 cP/25° C which contains urea groups in addition to the usual urethane groups. The polymer was prepared in a similar manner to top coat D16 but using a mixture of 220.7 g (1.87 mol) of hexane-1,6-diol, 38.7 g (0.43 mol) of butane-1,4-diol and 334.8 g (0.90 mol) of 4,4'-diphenylmethane-bis-($\beta$-hydroxyethyl-urea) as chain-lengthening agent (molar ratio 58:14:28).

Top coat solution D18 (comparison product) is a 25% solution of a polyester urethane in DMF/MEK (3:2) with a viscosity of 9600 cP/25° C. The polyester urethane was prepared in a similar manner to top coat D16 using 288.0 g (3.20 mol) of butane-1,4-diol as the only chain-lengthening agent.

Top coat solution D19 (comparison product) is a 25% solution of a polyester urethane in DMF with a viscosity of 10,000 cP/25° C. The polyester urethane was prepared in a similar manner to top coat D16 but the only chain-lengthening agent used was 1190.0 g (3.20 mol) of 4,4'-diphenylmethane-bis-($\beta$-hydroxyethyl-urea).

Top coats D16 and D17 can again be applied without difficulty (using bonding coats H2 and H4) but the hoarfrost effect occurs when D18 and D19 are applied in a similar manner.

What is claimed is:
1. A process for producing coated textile sheets which comprises:
   (A) applying to a release substrate an organic solvent solution top coat of a substantially linear polyurethane which is substantially free of reactive end groups prepared by a process comprising reacting,
      i. an organic dihydroxy compound of molecular weight 500 to 4,000 and
      ii. a mixture of at least two organic diols of molecular weight 62 to 450 with at least two of which diols are present in a quantity of more than 5 mol %, and
      iii. an aromatic diisocyanate, using a molecular ratio between components i) and ii) of 1:1 to 1:5 and an NCO/OH ratio of 0.95: 1.05,
   (B) evaporating sufficient solvent to leave a substantially dried top coat on said substrate,
   (C) applying a polyurethane bonding coat solution to said top coat characterized in that said polyurethane bonding coat solution contains at most 25% by weight, based on the total quantity of solvent, of dimethylformamide,
   (D) applying said textile sheet to be coated to said release substrate whereby said top coat and said bonding coat are therebetween,
   (E) substantially evaporating the solvent from said bonding coat and,
   (F) separating the resulting coated textile from said release substrate.

* * * * *